United States Patent [19]

Smith et al.

[11] Patent Number: 5,456,066
[45] Date of Patent: Oct. 10, 1995

[54] FUEL SUPPLY SYSTEM AND METHOD FOR COAL-FIRED PRIME MOVER

[75] Inventors: William C. Smith; Leland E. Paulson, both of Morgantown, W. Va.

[73] Assignee: United States Department of Energy, Washington, D.C.

[21] Appl. No.: 89,920

[22] Filed: Jul. 12, 1993

[51] Int. Cl.⁶ ............................................. F02C 7/26
[52] U.S. Cl. .................. 60/39.06; 60/39.182; 60/39.464
[58] Field of Search .......................... 60/39.464, 39.182, 60/39.02, 39.06

[56] References Cited

U.S. PATENT DOCUMENTS

| | | | |
|---|---|---|---|
| 2,055,385 | 9/1936 | Noack | 60/39.464 |
| 2,625,791 | 1/1953 | Yellott | 60/39.464 |
| 2,699,039 | 1/1955 | Yellott | 60/39.464 |
| 4,147,116 | 4/1979 | Graybill | 431/185 |
| 4,287,838 | 9/1981 | Frosch | 60/39.464 |
| 4,335,684 | 6/1982 | Davis . | |
| 4,342,428 | 8/1982 | Kosek . | |
| 4,345,527 | 8/1982 | Marchand . | |
| 4,662,315 | 5/1987 | Sommer . | |
| 4,692,171 | 9/1987 | Firey . | |
| 4,862,837 | 9/1989 | Holmes . | |

*Primary Examiner*—Timothy S. Thorpe
*Attorney, Agent, or Firm*—David E. Breeden; Stephen D. Hamel; William R. Moser

[57] ABSTRACT

A coal-fired gas turbine engine is provided with an on-site coal preparation and engine feeding arrangement. With this arrangement, relatively large dry particles of coal from an on-site coal supply are micro-pulverized and the resulting dry, micron-sized, coal particulates are conveyed by steam or air into the combustion chamber of the engine. Thermal energy introduced into the coal particulates during the micro-pulverizing step is substantially recovered since the so-heated coal particulates are fed directly from the micro-pulverizer into the combustion chamber.

7 Claims, 2 Drawing Sheets

FUEL SUPPLY SYSTEM AND METHOD FOR COAL-FIRED PRIME MOVER

The United States Government has rights in this invention pursuant to the employer-employee relationship of the U.S. Department of Energy and the inventors.

BACKGROUND OF THE INVENTION

The present invention relates generally to coal-fired primer movers driven by gaseous combustion products produced by the combustion of substantially dry coal particulates. More particularly, the present invention is directed to a coal-fired gas turbine engine or a reciprocating compression ignition engine in combination with an on-site coal preparing and supplying system capable of micro-pulverizing by coal particles and feeding the resulting micron-sized coal particulates into the combustion chamber of the selected engine.

The use of coal is of considerable interest as a replacement fuel for liquid and gaseous fuels such as fuel oil and natural gas for the firing gas turbines or compression ignition engines (Diesel). In coal-fueled gas turbine systems, fine coal particulates are supplied to the gas turbine combustor as a coal-water slurry rather than in the form of dry coal particulates since the pumping of such slurries, especially across a pressure barrier, is considerably easier to achieve with existing pumping systems than the pumping of dry coal particulates across and also reduces erosion problems associated with the pumping and valving systems in the fuel supply. By using such coal-water slurries, a relatively smooth combustion operation is achieved as compared to previously known arrangements for using dry coal as the fuel since relatively rapid changes in the flow rate of Combustion gases from the combustor to the turbine such as caused by several factors including the use of lock-hoppers which provide a pulse feed may result in turbine damage. Typically, the previously known fueling of gas turbines engines with coal-water slurries required that relatively large particles of coal be pulverized in a highly energy intensive mill to coal particulates of a size less than about 100 microns for combustion in the gas turbine combustor so that the ash and other products of combustion would be sufficiently small so as to provide minimal erosion problems in the turbine and combustion would be rapid. The coal particulates provided by the pulverizing mechanism are mixed with water at about a 1:1 ratio, by weight, so as to provide the coal-water slurry with an adequate pumping viscosity. Also, viscosity reducing and combustion stability increasing chemicals are frequently incorporated in coal-water slurries to enhance the combustion operation. This preparation of coal-water slurries for use in gas turbine engines is often provided at off-site locations and usually includes processes for removing sulfur and inorganic minerals normally found in coal. The resulting "clean" coal is then transported to storage tanks at the point of use by employing relatively expensive transportation modes such as tank trucks and the like. Thus, while the use of coal-water slurries in gas turbine systems provide many advantages over previously known uses of dry coal in such systems, there are still several shortcomings associated with the coal preparation, transportation, and handling of the coal at the engine site which detract from the use of coal-water slurries as a viable fuel in gas turbine applications.

The use of dry coal particulates as the fuel in internal combustion Diesel-type engines does not pose as many problems as previously found to be present with the use of coal in external combustion or gas turbines engines. Some success has been achieved by fumigating micro-pulverized coal particulates into the combustion chamber of Diesel-type engines with a stream of the combustion supporting air.

Mechanical milling mechanisms used to micro-pulverize the coal for use in the combustion chambers of the internal or external combustion engines consumes a considerable amount of energy. In using mechanical milling apparatus in manners as previously employed for appropriately micro-pulverizing the coal, whether in the form of bituminous, sub-bituminous, or lignite, consumes considerable energy with a substantial part of this energy being expended by increasing the temperature of the coal particulates during the milling operation. Much, if not all, of this thermal energy was not previously recoverable in the operation of the engine since in most systems the coal preparation was normally provided at off-site locations. This considerably expenditure of energy for the micro-pulverizing of coal and the lack of adequate recovery of this thermal energy also substantially detracted from the use of micro-pulverized coal in Diesel-type and gas turbine engines.

SUMMARY OF THE INVENTION

Accordingly, it is a primary aim of objective of the present invention to provide a coal-fired prime mover system by providing an on-site coal preparation and coal feeding arrangement in combination with the coal-fired prime mover so as to obviate or substantially minimize problems such as described above and associated with the use of dry coal as the fuel in internal and external types of combustion systems. Generally, the present invention is directed to coal-fired energy generating systems incorporating prime mover means driven by gaseous combustion products produced by the combustion of substantially dry coal particulates in the presence of air in an internal or external combustion chamber means operatively associated with prime mover means, such as a gas turbine or reciprocating pistons. This coal preparing and feeding arrangement comprises fluid supply means for supplying a stream of motive fluid at a pressure substantially greater than atmospheric pressure. First conduit means are coupled to the fluid supply means for receiving and conveying the stream of fluid therefrom. Coal supply means provide a stream of substantially coal particles at a pressure greater than atmospheric pressure through second conduit means coupled to the coal supply means. Milling means are adapted to receive therein the streams of the motive fluid and the substantially dry coal particles from the first and second conduit means for breaking up the coal particles into substantially dry coal particulates of a size significantly smaller than the size of the coal particles. Third conduit means are coupled to the milling means for conveying therefrom a stream formed of the fluid with the substantially dry coal particulates entrained therein and at a pressure substantially greater than atmospheric pressure to combustion chamber means for the combustion of the coal particulates therein for generating the gaseous combustion products used for driving the prime mover means operatively associated with the combustion chamber means.

The stream of hot gaseous combustion products discharged from the prime mover means through fourth conduit means for use in boiler means or air-compressing means, operatively associated with the fluid supplying means for producing the stream of motive fluid. The coal supply means comprise lock hopper means adapted to provide the stream of coal particles in a size range of about 0.5 to 0 inch at a pressure of greater than atmospheric pressure. These coal particles are pulverized in the milling means to a particulate size of a size less than about 500 microns and suitable for use in a compression-type internal combustion engine or to a size fraction less than about 100 microns and suitable for used in a combustor of a gas turbine engine. Preferably, the milling means is a fluid energy impact mill adapted to pulverize the coal particles to provide said coal particulates through colliding, fluid driven coal particles which impact at sufficient velocities to break-up the coal particles.

Another object of the present invention is to provide for firing gas turbines with substantially dry coal particulates by providing a dry coal feeding system operable at a steady feed rate and at a sufficient pressure and volume for efficient operation of the gas turbines while eliminating turbine damage from pressure fluctuations heretofore encountered when supplying the external combustor of the gas turbine with dry coal particles.

Another object of the present invention is to provide for the substantial recovery of thermal energy instilled in the coal particulates during the pulverization of the coal particles by introducing the resulting pulverized coal particulates while still so heated into the combustor of the primer mover means.

A further object of the present invention is to replace the coal-water slurry feed arrangements previously utilized in gas turbine systems with a coal-steam arrangement which feeds substantially dry micron-sized coal particulates into the combustor and thereby increases the thermal efficiency of the gas turbine by obviating energy losses associated with the evaporation of the water in the coal-water slurry during the combustion cycle.

A still further object of the present invention is to provide a coal-fired reciprocating combustion ignition engine with a fuel preparing and delivery system for providing and delivering dry coal particulates to the combustion chamber of the internal combustion engine.

Preferred embodiments of the invention have been chosen for the purpose of illustration and description. The preferred embodiments illustrated are not intended to be exhaustive nor to limit the invention to the precise forms shown. The preferred embodiments and method for operating the same are chosen and described in order to best explain the principles of the invention and their application and practical use to thereby enable others skilled in the art to best utilize the invention in various embodiments and modifications as are best adapted to the particular use contemplated.

DETAILED DESCRIPTION OF THE INVENTION

As generally described above, the present invention is directed to the operation of energy generating prime mover means by gaseous combustion products produced by the combustion of coal particulates in the presence of air. In accordance with the present invention, combustion chamber means operatively associated with the prime mover means are provided with a stream of substantially dry coal particulates of a size fraction less than about 500 microns, by the steps comprising: providing a stream of fluid at a pressure substantially greater than atmospheric pressure; providing a stream of substantially dry coal particles of a size substantially greater than that of the coal particulates; pulverizing the coal particles in milling means to provide the coal particulates of the size fraction less than about 500 microns; and pneumatically conveying the dry coal particulates in a stream of the fluid to the combustion chamber means for the combustion of the coal particulates for driving the prime mover means. Particulate mineral matter and ash are preferably removed from the stream of fluid and coal particulates prior to pneumatically conveying the coal particulates into the combustion chamber means. Also, for the purpose of this description and claims the phrase "pneumatically conveying" is generic to the use of air or steam as the motive fluid.

Figure 1:
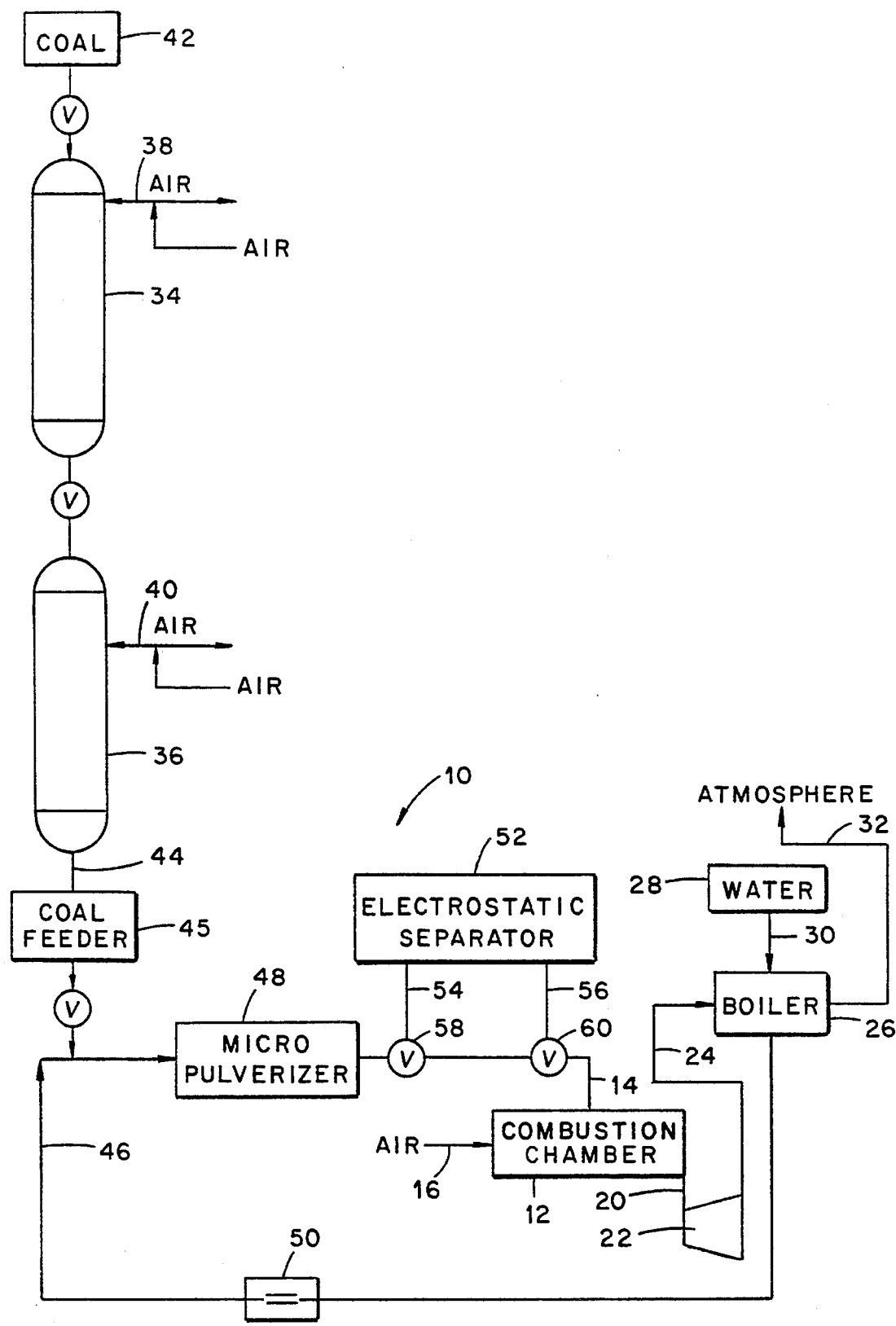
FIG. 1 is a schematic illustration of coal-fired gas turbine engine incorporating one embodiment of the on-site coal preparing and delivery system of the present invention.

In the gas turbine embodiment shown in FIG. 1, the stream of fluid is superheated steam at a pressure in the range of about 300 to 700 psi and at a temperature of about 450°–550° F. The steam is preferably utilized at steam-to-coal particle ratio of about 1 to 1 by weight, for use in the step of pulverizing the coal particles in the milling means. The stream of the coal particulates pneumatically conveyed by the superheated steam to the combustion chamber means is at a pressure in the range of about 100 to about 500 psi. Also, with steam as the motive fluid, the combustion chamber means is supplied with sufficient air to support the combustion of the coal particulates therein.

When the prime mover means comprises a gas turbine, as in the FIG. 1 embodiment, the coal particles prior to the pulverization thereof in the milling means are of a size in the range of about 0.5 by 0 inch and are at a pressure substantially corresponding to the pressure of the steam. The coal particles are pulverized in the milling means to a maximum particulate size of less than 100 microns, preferably in the range of about 10–50 microns. In this embodiment, gaseous combustion products discharged from the gas turbine are passed in a heat exchange relationship with water, such as in a boiler, for generating the steam.

Figure 2:
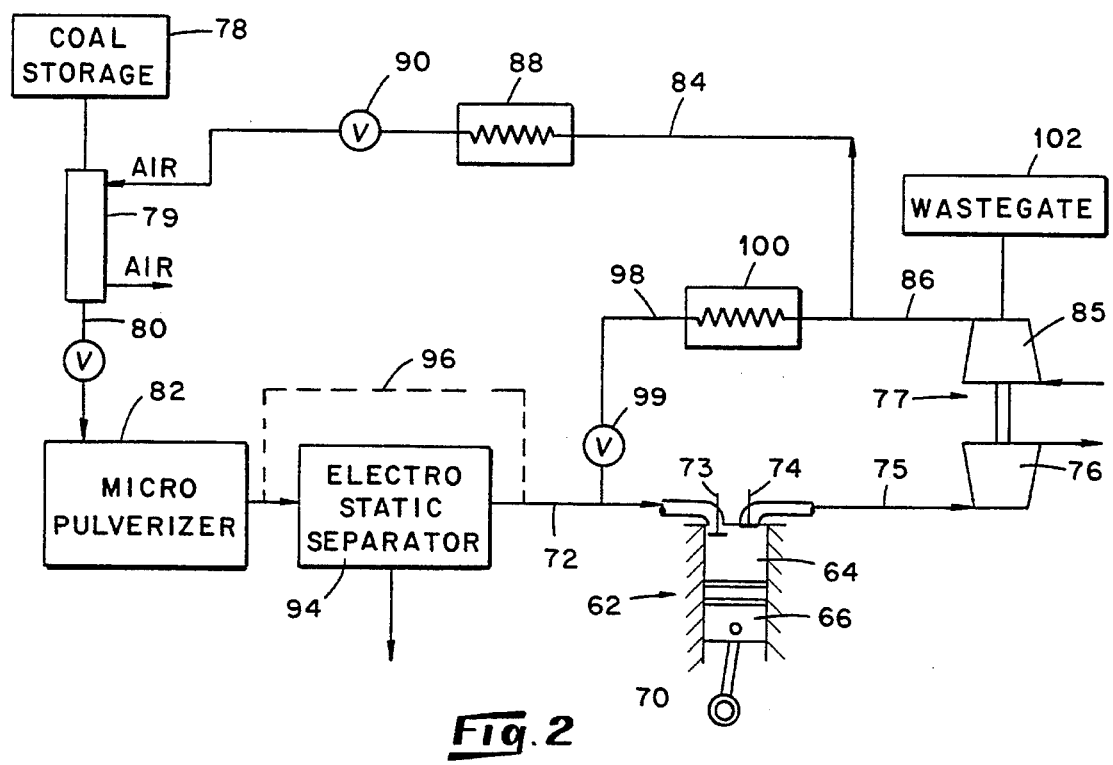
FIG. 2 is a schematic illustration of a coal-fired diesel-type engine incorporating another embodiment of the on-site coal preparing and delivery system of the present invention.

When the prime moving means comprises an internal combustion engine having piston means driven by the gaseous products of combustion, as in the FIG. 2 embodiment, the stream of fluid is air at a pressure of about 50 to 75 psia, preferably at an air-to-coal particle ratio of about 1 to 1 by weight when the air is used in the step of pulverizing the coal particles in the milling means. The coal particles prior to the pulverization thereof are of a size in the range of about 0.5 by 0 inch and are pulverized in the milling means to a particulate size fraction less than about 500 microns, preferably in the range of about 5 to 50 microns. The stream of air is compressed air provided by air compressing means, preferably a turbo-charging arrangement driven by the exhaust gases.

With particular reference to the embodiment of FIG. 1, the coal-fired gas turbine system incorporating the coal preparing and supplying system is generally shown at 10. The coal-fired gas turbine comprises an external combustion chamber 12 for burning dry coal particulates of a size less than about 100 microns, preferably in the range of about 10 to 50 microns. These coal particulates are delivered through line 14 to the combustion chamber 12 where these coal particulates are burned in the presence of air delivered through line 16 into the combustion chamber 12 from a suitable high pressure source such as an air compressor (not shown). Coal particulates of the aforementioned size are used in the gas turbine engine in order to provide for complete combustion of the coal particulates as well as providing ash and other solid particulates resulting from the combustion of a sufficiently small size so as to cause minimal erosion and other damage to the turbine components. The hot gaseous combustion products provided by the combustion of the coal particulates are conveyed from the combustion chamber 12 through conduit 20 into a gas turbine generally shown at 22, which typically operates at a pressure in the range of about 100 to about 450 psi. The gas turbine 22 is conventionally coupled to a generator or other power extraction device (not shown).

In this embodiment of the present invention the coal particulates are combined with steam which is used for the pulverization of the coal particles in the milling mechanism, as will be described below, and also provides the motive fluid for propelling or pneumatically conveying micron-sized substantially dry, coal particulates into the combustion chamber 12. The steam augments the mass of combustion products to increase the efficiency of the system. Further, the use of steam-coal particulate mixture provides substantial improvements over the previously employed coal-water slurries from the standpoint of system efficiency since a considerable portion of the system efficiency was previously expended in the evaporation of this water in the combustion chamber.

After driving the gas turbine 22, the spent hot gases are discharged from the turbine 22 through discharge line 24 and are utilized in a heat exchanger or boiler 26 for converting water, delivered to the boiler 26 from a suitable source 28 through line 30, into saturated steam at a pressure of about 500 to 1100 psia for use in the preparation and the delivery of the coal to the combustion chamber 12 as will be described below. The lo gases are discharged from the boiler 26 to atmosphere through line 32 which may contain suitable clean-up mechanisms (not shown) for removing environmental pollutants such as sulfur and nitrous oxides from the exhaust gases.

In accordance with the present invention, the coal preparation and coal conveying system used to provide the steam-coal particulate feed to the combustion chamber 12 of the gas turbine system is shown comprising a stacked pair of conventional lock hoppers 34 and 36 which are pressurized to a system operating pressure in the range of about 300 to 700 psi by employing air or another suitable pressurizing medium such as nitrogen through lines 38 and 40, respectively. This lock-hopper coal as provided from a suitable bunker or storage facility 42 is of a particle size in the range of about 0.5 by 0 inch and is fed from the lock hoppers 36 through a line 44 containing a coal feeder such as a rotary valve or other suitable metering device 45 into a steam line 46 which is coupled to the boiler 26 and a coal micro-pulverizing mechanism 48. The steam in line 46 at the point of intercepting and entraining the coal delivered from the coal feeder 45 is superheated steam (about 50° F. superheat is sufficient) at a temperature in the range of about 450° to about 600° F. and at a pressure in the range of about 300 to 700 psi. The superheated steam is conveniently provided by passing the saturated steam from the boiler 26 through an expansion device 50 contained in line 46. The superheated steam entrains the coal particles from the coal feeder 45 and conveys these coal particles into the coal crushing or pulverizing device 48 for reducing the size of the 0.5 by 0 inch coal particles to coal particulates of a micron size suitable for use in the gas turbine system such as described above. Satisfactory results have been achieved by using coal particulates of a size in the range of about 10 to 100 microns, preferably about 10–50 microns.

The micro-pulverization of the coal particulates in the coal pulverizer 48 can be provided by using any conventional pulverizing device such as an impact, ring roller, or any other suitable micro-pulverizer. However, since the pulverization of the coal particles into the micron size coal particulates is very energy intensive and significantly reduces the overall system efficiency, the micro-pulverizing of the coal is preferably provided by employing a fluid energy mill such as described in U.S. Pat. No. 4,219,164. Generally, the fluid energy mill as described in this patent provides for the micro-pulverization of the coal by introducing streams of coal-laden gases as high speed jets into the fluid energy mill with the coal particles in these coal-laden gas streams colliding against one another until the coal is adequately shattered. The impacting of the coal particulates against one another by the colliding streams is substantially similar to effects achieved by sand blasting so as to substantially reduce the size of the coal particles to the desired size of the coal particulates. Also, during this micro-pulverization of the coal, non-combustible minerals are normally liberated from the coal. These minerals as well as any ash that may result from the heating of the coal with the steam can be removed by employing a suitable separation mechanism 52 placed in line 14 downstream of the pulverization device 48 as will be described below. In order to efficiently operate the fluid energy mill 48, an approximately 1:1 ratio, by weight, of steam to coal is preferably used so as to provide a sufficient quantity of steam for propelling the coal particulates against one another to provide the desired reduction rate as well as providing the motive fluid for transporting the coal to the combustor 12. This ratio of steam to coal is approximately the same mass flow ratio of water to coal used in the previously known coal-water slurry systems. During the operation of fluid energy mill, a pressure drop in the range of about 200 psi usually occurs across the pulverizer 48. Thus, in order to provide the coal feed to the combustion chamber 12 at a pressure in the range of about 100 to 500 psi, the steam introduced into the fluid energy mill 48 should be at least 200 lbs greater than that desired for use in the combustor 12. Inasmuch as the fluid energy mill described in the aforementioned patent is of the type preferably used for the reduction of the coal particles to the desired particulate size and since the energy losses in such a pulverizing device is substantially lower than achievable in other known coal micro-pulverizing devices usable in the present system, this patent is incorporated herein by reference.

The pulverized coal particulates are conveyed by the steam from the micropulverizer 48 through line 14 into the combustion chamber 12 for the combustion of the coal to provide the motive fluid for driving the gas turbine 22. The pressure of the steam-coal mixture in line 14 is about 100 to 500 psi with the steam in a superheated state so as to produce little or no wetting of the pulverized coal particulates. Thus, the coal particulates delivered into the combustion chamber 12 contains essentially no added water and are substantially dry except for residual moisture.

As mentioned above, some mineral matter and ash particles may be contained in the coal delivered from the micro-pulverizer 48 which can be separated from the coal particulates. These particles of mineral matter and ash may be readily removed from the coal particulates by employing a separation device 52 such as an electrostatic separator or any other suitable type of separator. The separator 52 may be coupled in line 14 at a location between the fluid energy mill 48 and the combustion chamber 12 or be coupled in a by-pass circuit formed of conduits 54 and 56 containing valves 58 and 60 at the juncture of lines 54 and 56 with line 14 to provide for the selective use of the separator 52.

The utilization of the gas turbine system in combination with the coal preparing and delivery system in accordance with the present invention provides for a significant improvement over the previous gas turbine systems using a coal-water slurry as the fuel. For example, the injection of the finely-divided, substantially dry coal particulates into the combustion chamber 12 can be achieved without using coal-water slurry atomizers as previously required. Also, the coal can be provided at a significantly reduced cost since only dry coal particles need to be delivered to the site of the gas turbine engine whereas in previous practices the coal-water slurry was normally prepared at a site remote to the gas turbine engine. Further, the combustion of the preheated coal-steam mixture should be substantially easier to achieve in a gas turbine combustor and at a higher rate of combustion than obtainable with a coal-water slurry since the dry coal particulates will be rapidly dispersed within the combustion chamber 12 to facilitate the combustion of the coal particulates in the air delivered through line 16. Also, by using the micro-pulverizer 48 in the system, essentially all of the thermal energy lost by heating the coal during the micro-pulverization thereof is recovered in the system since the hot coal particulates are directly transported from the micro-pulverizer 48 into the combustion chamber 12.

In the embodiment of FIG. 2 a reciprocating, compression-ignition engine (Diesel) is combined with a coal preparing and delivery system for feeding substantially dry coal particulates to the combustion chamber. The Diesel-type engine as shown at 62 comprises internal combustion chamber 64 with a reciprocating piston 66 contained in cylinder 70 while only a single cylinder engine 62 is shown it will appear clear that the engine 62 could be of any standard multiple cylinder construction. Dry coal particulates of a size of about 100 to 500 microns are pneumatically conveyed, preferably with sufficient air to support combustion of the coal, through line 72 and fumigated into the combustion chamber 64 through a conventional inlet valve 73 for the combustion thereof to provide the high-pressure gaseous combustion products required for driving the piston 16 in a conventional reciprocating manner. As shown the gaseous combustion products after driving the piston 66 through the power stroke are discharged from the combustion chamber 64 through the exhaust valve 74 and line 75 to a turbine 76 of a turbocharger 77 which is preferably used in the present invention to provide the compressed air used for conveying the coal from the coal source to the engine 62 as well as for use in the micro-pulverizer, preferably a fluid energy mill of the type described in the aforementioned patent, used to crush coal particles into the desired micron-sized coal particulates. Instead of using a turbocharger, the compressed air could be supplied by a suitable compressor (not shown) driven by the engine 62. The air provided by the turbocharger or the compressor is pressurized to a pressure above atmospheric pressure, preferably at a pressure in the range of about 20 to 70 psia.

In this embodiment of the present invention, the coal contained in a bulk storage device 78 is suitably of a particle size in the range of about 0.5 to 0 inch. These coal particles are preferably conveyed through a lock hopper, generally shown at 79, or other conventional apparatus capable of feeding coal at a pressure up to about 70 psia through a valved line 80 into the coal pulverization device or fluid energy mill 82 that is capable of pulverizing the 0.5 by 0 inch coal to a particulate size in the range of about 100 to 500 microns. The coal particulates utilized in the internal combustion engine need not be as fine as those used in the gas turbine of the FIG. 1 embodiment so as to significantly reduce the energy requirements of the fluid energy mill. Also, while FIG. 2 shows the coal particles being delivered directly from the lock hopper 79 into the fluid energy mill 82, it will appear clear that the coal particles from the lock hopper 79 may be conveyed into the fluid energy mill 82 by using the compressed air stream in line 84 for entraining the coal particles discharged from the lock hopper 79 in a manner similar to the FIG. 1 embodiment.

Compressed air from the compressor 85 of the turbocharger 77 passes through line 86 to a junction where a portion of this air sufficient to support the micro-pulverization of the coal and pneumatic conveying of the coal particulates to the combustion chamber 64 is diverted through line 84 to the fluid energy mill 82. About one pound of air for each pound of coal is usually required for effecting the micro-pulverization of the coal in the fluid energy mill, but, of course, with the use of other types of micro-pulverizers, less air may be required. An intercooler/heater, as generally shown at 88, is placed in line 84 for providing the air to the micro-pulverizer 82 at a preselected temperature, preferably at a temperature in the range of about 100° to 400° F. A valve 90 is placed in air line 84 at a location downstream of the intercooler/heater 88 for controlling the volume of air delivered to the micro-pulverizer 82. The coal particulates are pneumatically conveyed from the coal pulverizer 82 via line 72 into a suitable mineral and ash separator, generally shown at as an electrostatic separator 94, for removing loose minerals and ash from the coal prior to delivery of the "clean" coal particulates into the combustion chamber 64. If desired, the electrostatic separator 94 can be bypassed if the coal being used is adequately free of mineral matter and/or ash by using a bypass arrangement defined by air line 96 fitted with appropriate valves (not shown) at the juncture thereof with line 72.

In the event the volume of air conveying the pulverized coal into the combustion chamber 64 through line 72 is insufficient for supporting the combustion of the coal particulates, additional air from the compressor 85 at a pressure corresponding to that of the coal-air mixture in line 72 can be mixed with the coal-air mixture in line 72 or separately delivered to the combustion chamber 64. This supply of additional air is shown provided by connecting air line 98 at the juncture with lines 84 and 86 and to air line 72 at a location downstream of the separator 94. This air line 98 is shown provided with a valve 99 for controlling the volume of air to be mixed with the coal-air mixture in line 72 and with an intercooler 100 which can be used to cool the air from a temperature of about 400° F. as discharged from the turbocharger compressor 85 to a temperature in the range of about 200° to 350° F. for pre-heating the coal-air mixture in line 72 to a temperature of about 100° to 200° F. and thereby increasing the combustion efficiency. With the air being provided by a turbocharger, a suitable waste gate 102 may be provided in the compressor discharge line 86 so that excess air may be spilled from the system.

In the embodiment of FIG. 2, air is shown as being used for the coal preparation and for providing the motive fluid for conveying the coal particulates, but it will appear clear that steam, preferably superheated steam, such as in the FIG. 1 embodiment, or natural gas can be used for these purposes. However, if steam or natural gas is so employed, then a suitable supply of air is needed for supporting the combustion of the coal particulates within the combustion chamber 62. This air may be provided by attaching an air line at any suitable point upstream of the engine inlet valve 73. Also, waste heat from the engine exhaust gases may be used in a suitable boiler for providing the steam.

It will be seen that through the present invention the integration of gas turbine engines or compression-ignition engines with the coal preparation and conveying system for direct utilization of the coal in such engines provides a novel combination of features including the incorporation of a micro-pulverizer within the coal preparation and conveying system so that relatively large size coal particles from an on-site bulk storage can be pulverized to micron-sized coal particulates and conveyed into the combustion chamber of the engine by a pneumatic carrier fluid formed of steam, air, or natural gas. Also, with the use of the present invention, a substantial amount of thermal energy previously lost in the pulverization of the coal is readily recovered since the hot coal product is delivered directly from the pulverizer into the combustion chamber and thereby provides for the recovery of a substantial amount of the thermal energy contained in the pulverized coal.

What is claimed is:

1. A coal-fired energy generating system incorporating gas turbine means driven by gaseous combustion products produced by the combustion of substantially dry coal particulates in the presence of air and steam in combustion chamber means connected to the gas turbine means, said system consisting essentially of steam generating means for supplying a stream of steam at a pressure greater than atmospheric pressure and at a temperature adequate to sufficiently superheat the steam to substantially inhibit wetting of the coal particles, first conduit means coupled to the steam generating means for receiving and conveying the stream of superheated steam therefrom, coal supply means for providing a stream of substantially dry coal particles in a size range of about 0.5 to 0 inch and at a pressure essentially corresponding to the pressure of the superheated steam, second conduit means coupled to the coal supply means for conveying the stream of coal particles therefrom, milling means adapted to receive therein the streams of the superheated steam and the substantially dry coal particles from the first and second conduit means for breaking up said coal particles into substantially dry coal particulates of a size less than about 50 microns and significantly smaller than the size of said coal particles, combustion chamber means, third conduit means coupled to said milling means for conveying therefrom a stream formed of the superheated steam with the substantially dry coal particulates entrained therein and at a pressure greater than atmospheric pressure to the combustion chamber means for the combustion of the coal particulates therein to generate the gaseous combustion products for driving the gas turbine means, fourth conduit means connecting the gas turbine means to the team generating means for conveying to the steam generating means a stream of gaseous combustion products discharged from the gas turbine means for producing the stream of superheated steam, and air supply means coupled to the combustion chamber means for providing a volume of air sufficient to support the combustion of the coal particulates in the presence of steam in the combustion chamber means.

2. The coal-fired energy generating system as claimed in claim 1, wherein the milling means is a fluid energy impact milling means adapted to pulverize the coal particles to provide said coal particulates by collisions between fluid-driven coal particles which collide at sufficient velocities to break-up the coal particles.

3. The coal-fired energy generating system as claimed in claim 1, wherein said coal supply means comprise lock hopper means adapted to provide the stream of coal particles at a pressure in the range of about 300 to 700 psi, and wherein the steam is at a pressure in the range of about 300 to 700 psi and at a superheat temperature in the range of about 450° to 550° F.

4. The coal-fired energy generating system as claimed in claim 11, wherein separating means are coupled to the third conduit means for removing particulate mineral matter and ash from the stream of coal particulates and fluid prior to the conveyance thereof into the combustion chamber means.

5. In the art of driving energy generating gas turbine means by gaseous combustion products produced by the combustion of coal particulates in the presence of steam and air, the method for supplying combustion chamber means coupled to the gas turbine means with a stream of substantially dry coal particulates of a particulate size fraction less than about 50 microns by the steps consisting essentially of; providing a stream of steam at a pressure in the range of about 300 to 700 psi and at a temperature in the range of about 450°–550° F. and sufficiently superheated to substantially inhibit wetting of the coal particulates; providing a stream of substantially dry coal particles of a size substantially greater than that of said coal particulates and at a pressure essentially. corresponding to the pressure of the superheated steam; contacting and entraining the stream of the substantially dry coal particles with the stream of superheated steam at a steam-to-coal ratio of about one-to-one for conveying the coal particles into milling means pulverizing the coal particles in the milling means in the presence of the superheated steam to provide the substantially dry coal particulates of said size fraction of less than about 50 microns; conveying the resulting substantially dry coal particulates in a stream of the superheated steam at a pressure in the range of about 100 to 500 psi to the combustion chamber means conveying into the combustion chamber means a stream of air at a pressure essentially corresponding to the pressure of the stream of steam and coal particulates for supporting the combustion of the coal particulates therein in the presence of steam to generate the gaseous combustion products for driving the gas turbine means.

6. The method for supplying combustion chamber means operatively associated with prime mover means with a stream of substantially dry coal particulates as claimed in claim 15, including the further step of removing particulate mineral matter and ash from the stream of fluid and coal particulates prior to conveying the coal particulates into the combustion chamber means.

7. The method for supplying combustion chamber means operatively associated with prime mover means with a stream of substantially dry coal particulates as claimed in claim 12, wherein the coal particles prior to the pulverization thereof in said milling means are of a size in the range of about 0.5 by 0 inch and are pulverized in said milling means to said particulate size fraction, and including the step of passing gaseous combustion products discharged from the gas turbine in a heat exchange relationship with water for generating the stream of superheated steam.

* * * * *